United States Patent [19]
Kim

[11] Patent Number: 5,018,141
[45] Date of Patent: May 21, 1991

[54] CIRCUIT FOR SEPARATING VOICE, DATA AND SIGNALING INFORMATION

[75] Inventor: Ki-Cheol Kim, Suwon, Rep. of Korea

[73] Assignee: SamSung Electronics, Co., Ltd., Suwon, Rep. of Korea

[21] Appl. No.: 400,945

[22] Filed: Aug. 31, 1989

[30] Foreign Application Priority Data

Aug. 31, 1988 [KR] Rep. of Korea ............... 1988-11204

[51] Int. Cl.$^5$ ............................................. H04J 3/12
[52] U.S. Cl. ................................................ 370/110.1
[58] Field of Search ..................... 370/60, 110.1, 112

[56] References Cited

U.S. PATENT DOCUMENTS

4,701,913 10/1987 Nelson ............................ 370/110.1
4,727,541 2/1988 Mori et al. ...................... 370/110.1

*Primary Examiner*—Douglas W. Olms
*Assistant Examiner*—Melvin Marcelo
*Attorney, Agent, or Firm*—Robert E. Bushnell; Marc A. Miller

[57] ABSTRACT

There is disclosed a circuit which can provide services of voice (referring to voice data) and data (referring to non-voice data) not only through the existing digital network but also through the integrated service digital network (ISDN), and separates voice, data and signaling information. The improvement includes: a serial/parallel conversion means which shifts and inputs in consecutive order the received data having serial basic access channel structure and outputs it in parallel; a first parallel/serial circuit which inputs in parallel only data from a certain designated output port of said serial/parallel conversion means and transmits it one bit by one bit in consecutive order and transmits it toward said data terminal; a second parallel/serial circuit which inputs a reversed RxSHEN signal and only voice from a certain designated output port of said serial/parallel conversion means by the second transmission clock which is applied from frequency divider and transmits them one bit by one bit in consecutive order toward a combo-codec; and a data collection means which inputs and collects only signaling information from the designated output port of said serial/parallel conversion means during a prescribed number of frame periods.

7 Claims, 4 Drawing Sheets

CIRCUIT FOR SEPARATING VOICE, DATA AND SIGNALING INFORMATION

BACKGROUND OF THE INVENTION

The present invention relates to a digital telephone which can be provided with services of voice (referring to voice data) and data (referring to non-voice data) at the same time and, in particular, to a circuit which separates received data formed of a basic access frame into voice, data and signaling information.

Generally, the digital telephone is provided with the services of voice and data according to a time compression multiplexing (hereinafter referred to as TCM) transmission method, by being connected to a private branch exchange (PBX) or a key telephone system equipped with a digital network.

Figure 1:
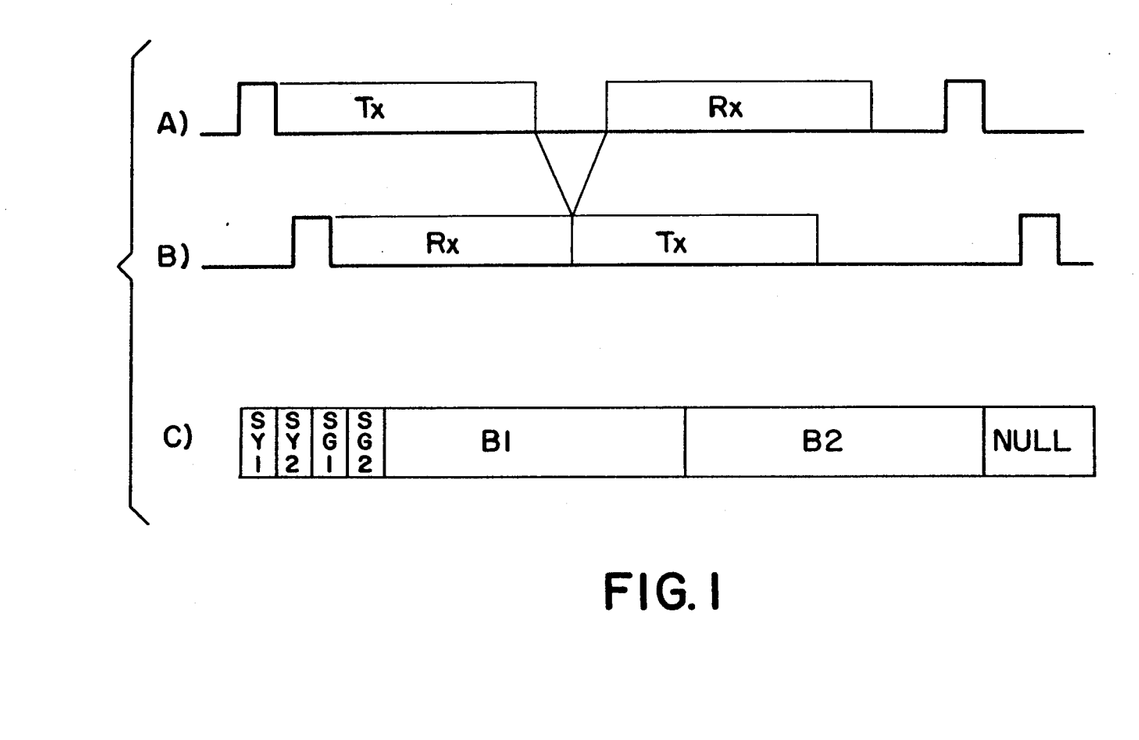
FIG. 1 is an illustration of a data format formed of transmission frame and basic access channel.

The frame structure of basic access is one of the frame structures of integrated service digital network (hereinafter referred to as ISDN) which arose in response to an increase in communication caused by the congestion of information and knowledge. It is formed of two B channels which can provide voice and data at the same time and of one D channel which transmits information for control. In other words, it is of 2B+D channeled structure. The transmission format according to said TCM transmission method becomes like A and B in FIG. 1. The A in FIG. 1 is the transmission format on the private branch exchange or key telephone system and the B in FIG. 1 is the transmission format in the digital telephone. The data format of basic access becomes like C in FIG. 1. The C in FIG. 1 corresponds to the transmission frame Tx or reception frame Rx in A and B of FIG. 1, respectively. The synchronization information SY1, SY2, signaling information SG1, SG2 and null bits in C of FIG. 1 correspond to D channel, while voice and data correspond to B1 channel and B2 channel, respectively.

SUMMARY OF THE INVENTION

Accordingly, an object of the present invention is to provide a circuit which can provide services of voice and data not only through the existing digital network but also through the integrated service digital network (ISDN), and separates voice, data and signaling information.

According to an aspect of the invention, the inventive circuit for separating voice, data and signaling information having a central processing unit, a combo-codec and a frequency divider includes: a serial/parallel conversion means which shifts and receives in consecutive order a received data having serial basic access channel structure and outputs the received data in parallel; a first parallel/serial circuit which receives in parallel a frame synchronous bar signal which is applied from a frequency divider and only data information from a certain designated output port of the serial/parallel conversion means and, in accordance with a first transmission clock signal, transmits the data information one bit by one bit in consecutive order toward a data terminal; a second parallel/serial circuit which receives an inverted receiving-shift-enable signal and only voice information from a certain designated output port of the serial/parallel conversion means and, in accordance with a second transmission clock signal which is applied from the frequency divider, transmits the voice information one bit by one bit in consecutive order toward the combo-codec; a data collection means which receives and collects a transmission-enable signal which is applied from a latch clock, address and frequency divider and only signaling information from a designated output port of the serial/parallel conversion means during a prescribed number of frame periods in accordance with the read signal which is applied from a central processing unit and transmits the signaling information to the central processing unit; and a data separation controlling means which supplies an serial/parallel conversion clock signal to the serial/parallel conversion means in accordance with a receiving-shift-enable signal, a third transmission clock signal and a frame synchronous generation clock signal which are supplied from the frequency divider and also in accordance with synchronization information which is drawn in from a designated port of the serial/parallel conversion means, and which supplies the receiving-shift-enable signal in inverted form for input period control to the second parallel/serial circuit and which further supplies a latch clock signal and an address for collection operation control to the data collection means.

BRIEF DESCRIPTION OF THE DRAWINGS

For a better understanding of the invention and to show how the same may be carried into effect, reference will now be made, by way of example, to the accompanying diagrammatic drawings, in which.

DETAILED DESCRIPTION OF THE PREFERRED EMBODIMENT

Now, a detailed description of the present invention will be made with reference to the drawings attached hereto.

Figure 2:
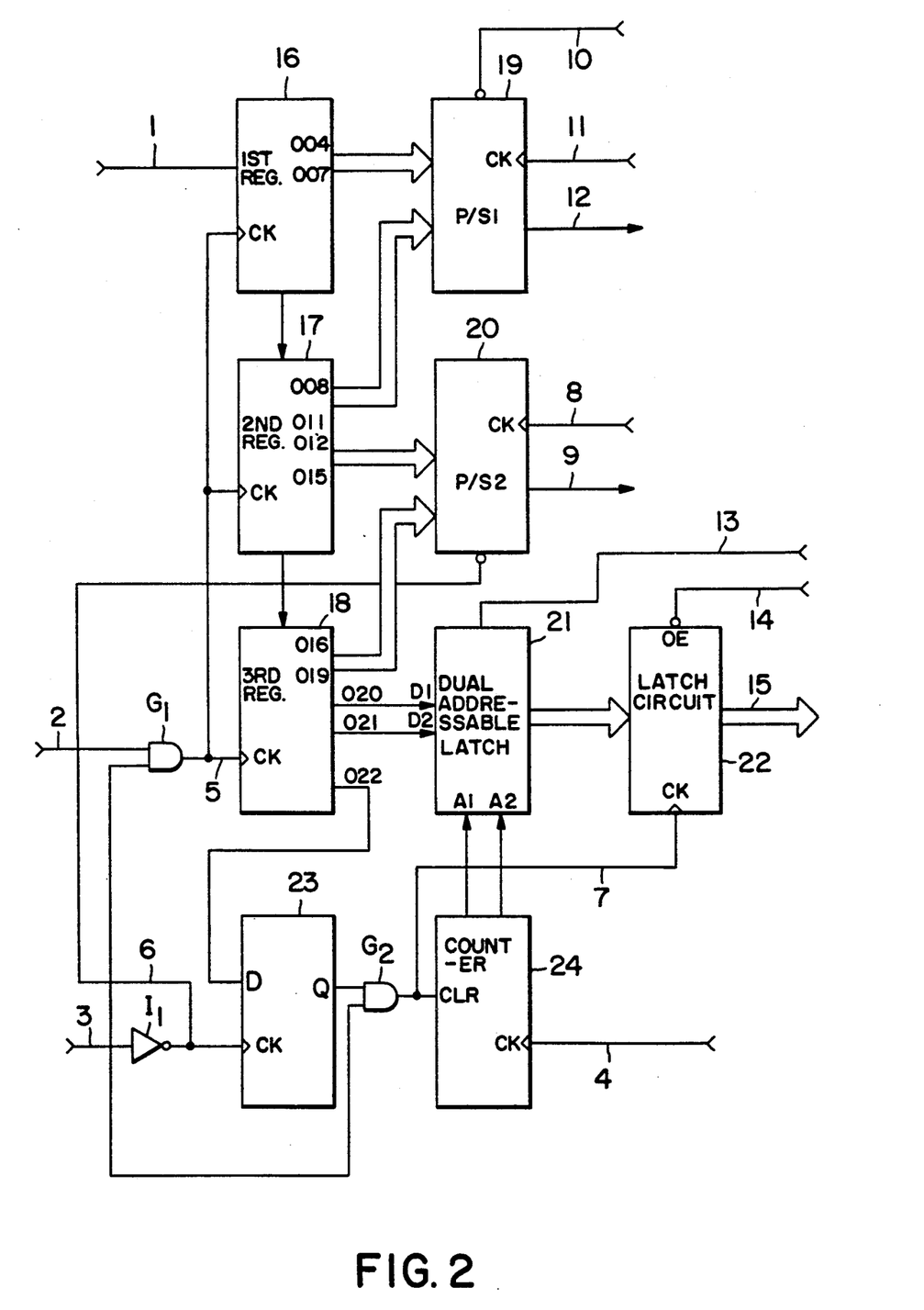
FIG. 2 is a circuit diagram of the present invention.

FIG. 2 is a system block diagram of the present invention, wherein a serial/parallel conversion circuit comprised of first to third registers 16–18 receives consecutively the received data having serial basic access channel structure and outputs it in parallel. A first parallel/serial circuit (P/S1) 19 receives in parallel a frame synchronous bar (hereinafter referred to as FS) signal applied from a frequency divider and only data information from a certain designated output port of the serial/parallel conversion circuit and, according to a first transmission clock signal, transmits it one bit by one bit in consecutive order toward a data terminal. In similar manner, a second parallel/serial circuit (P/S2) 20 receives an inverted Reception Shift Enable (hereinafter referred to as RxSHEN) signal RxSHEN and only voice information from a certain designated output port of the serial/parallel conversion circuit and according to a second transmission clock signal applied from the frequency divider, transmits it one bit by one bit in consecutive order toward a combo-codec (not shown).

A data collection circuit comprised of a dual addressable latch 21 and a latch circuit 22 receiving and collecting a Transmission Enable (hereinafter referred to as TxEN) signal applied from a latch clock, address and frequency divider receives only signaling information from the designated output port of the serial/parallel conversion circuit during a prescribed number of frame periods according to the read signal applied from the central processing unit.

Thereafter, a data separation control circuit comprised of an invertor I1, a flip-flop 23, a counter 24, and two AND gates G1, G2 supplies serial/parallel conversion clock signal to the serial/parallel conversion circuit according to the RxSHEN signal, a third transmission clock signal and frame synchronous generation clock signal which are supplied from the frequency divider and the synchronization information which is drawn in from the designated output terminal of the serial/parallel conversion circuit and, at the same time, supplies the inverted RxSHEN signal RxSHEN for input period control to the second parallel/serial circuit 20 and, on the other hand, supplies a latch clock signal and an address for collection operation control to the data collection means.

Figure 3A:
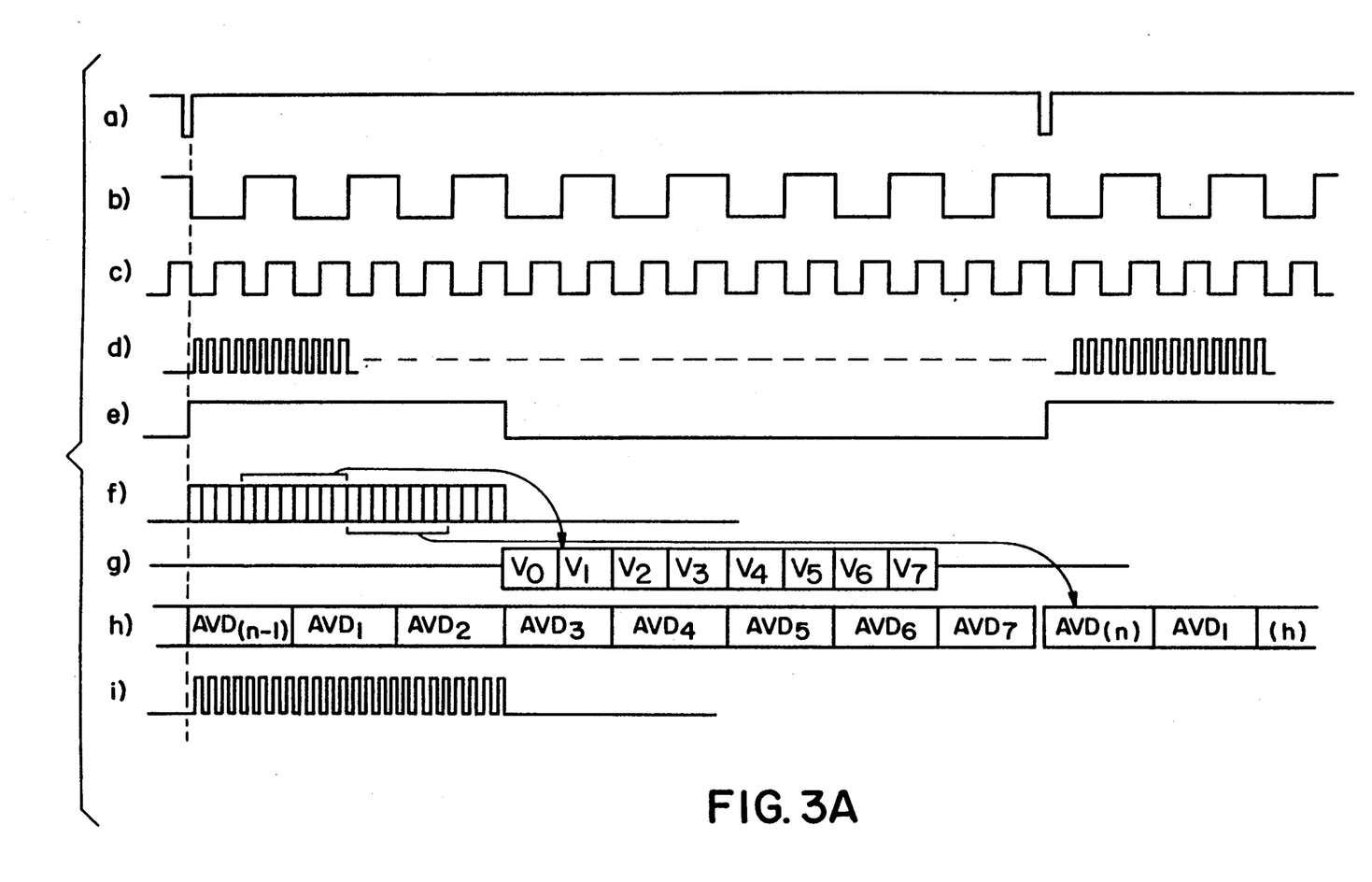
FIGS. 3A and 3B are timing diagrams for each part of FIG. 2.

Referring now to FIG. 3A, it is an operational timing diagram for each part of FIG. 2 made on the basis of the third transmission clock signal, wherein (a) is the FS signal; (b) is the first transmission clock signal; (c) is the second transmission clock signal; (d) is the third transmission clock signal; (e) is the RxSHEN signal; (f) is the received data; (g) is the separately outputted voice information; (h) is the separately outputted data information; and (i) is serial/parallel conversion clock signal.

Figure 3B:
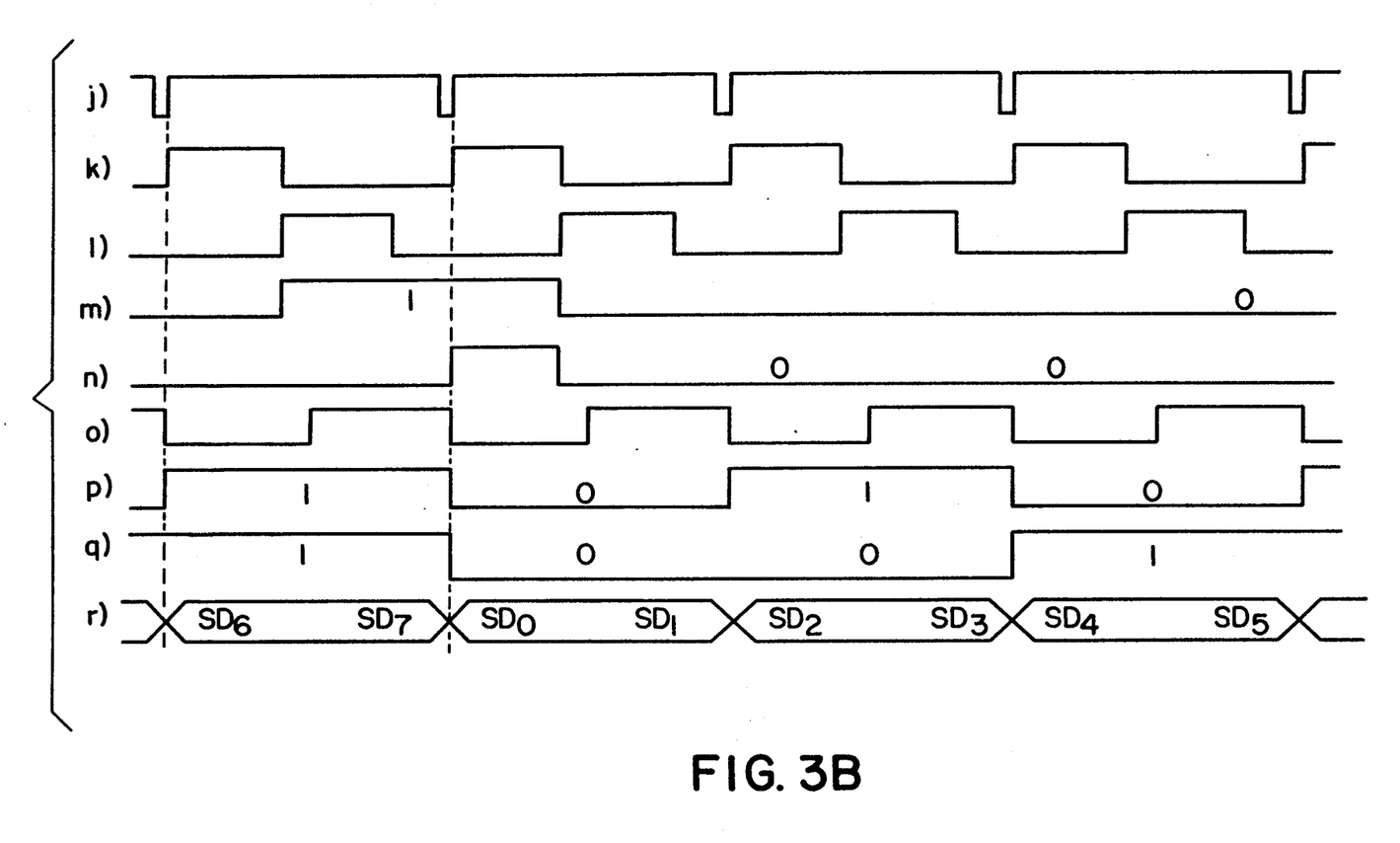

In FIG. 3B, an operational timing diagram for each part of FIG. 2 on the basis of the RxSHEN signal is shown specifically, wherein: (j) is the FS signal which is an operating waveform diagram identical with (a) of FIG. 3A; (k) is the RxSHEN signal which is an operating waveform diagram identical with (e) of FIG. 3A; (l) is the TxEN signal; (m) is an output waveform diagram of the flip-flop 23; (n) is a latch clock signal; (o) is a clock signal for frame synchronous generation; (p) and (q) are 2-bit addresses; and (r) is signaling information which is outputted from the third register 18.

Then, a detailed description of the present invention will be made with reference to FIGS. 1 to 3.

Giving an account of data separation control circuit which comprises the invertor I1, two AND gates G1, G2, the flip-flop 23 and the counter 24, it generates a control signal required for the separation of data having 2B+D-shaped basic access channel structure. Its generation process is as follows:

Firstly, the AND gate G1 executes the logical AND operation by receiving the third transmission clock signal (d) and the RxSHEN signal such as in (e) and (k) through lines 2 and 3, respectively. Hence, the serial/parallel conversion clock signal (i) is generated and supplied to the clock terminals CK of the first to third registers 16-18 through a line 5.

The flip-flop 23 which receives the most significant bit of synchronization information SY2 through its input terminal D from the output terminal 022 of the third register 18 and the RxSHEN signal like in (e) of FIG. 3A and (k) of FIG. 3B on the line 3 at its clock terminal CK after having inverted through the invertor I1 outputs to the output terminal Q of the flip-flop 23 the most significant bit of the synchronization information of its input terminal D from the falling edge of the RxSHEN signal which is inverted and inputted. Thus, it outputs an output signal like (m) of FIG. 3B to the second input terminal of AND gate G2.

Then, the AND gate G2 which receives the RxSHEN signal like in (e) of FIG. 3A and (k) of FIG. 3B on the line through its first input terminal and receives the output of the flip-flop 23 at its second input terminal generates the latch clock signal like in (n) of FIG. 3B by carrying out an AND operation of its two input signals and outputs it to the clear terminal CLR of the counter 24 and the clock terminal CK of latch circuit 22.

The counter 24 which receives the latch clock signal like in (n) of FIG. 3B on line 7 at its clear terminal CLR and the clock signal for frame synchronous generation like in (o) of FIG. 3B which is applied from the frequency divider through its line 4 to the clock terminal CK is initialized by the latch clock signal and then generates a 2-bit address like in (p) and (q) of FIG. 3B through two output terminals thereof by counting-up at the falling edge of the clock signal for frame synchronous generation and supplies it to the address terminals A1, A2 of the dual addressable latch 21.

On the other hand, the serial/parallel conversion circuit comprised of the first to third registers 16-18 which receives the received data like in (f) of FIG. 3A through the line 1 and receives the serial/parallel conversion clock signal like in (i) of FIG. 3A through the line 5 shiftingly inputs the received data in response to said serial/parallel conversion clock, one bit by one bit in consecutive order, and outputs it in parallel to output ports 000-023.

The first register 16 shifts the received data which is inputted through the line 1 from the output port 000 toward the output port 007 sequentially, in response to the serial/parallel conversion clock signal which is applied to the clock terminal CK thereof through the line 5, so as to produce in parallel lower four-bit data information as in (C) of FIG. A to the output ports 004-007.

Meanwhile, the second register 17 which receives the received data from the output port 007 of the first register 16 shifts in parallel this received data sequentially from the output port 008 toward the output port 015, so as to produce in parallel lower four-bit voice information as in (c) of FIG. 1 to the output ports 012-015.

The third register 18 which receives the received data from the output terminal 015 of the second register 17 shifts this received data one bit by one bit in consecutive order from output terminal 016 to output terminal 023 in accordance with the conversion clock signal which is applied through line 5. Thus, it finally outputs in parallel the upper 4-bit voice information in (c) of FIG. 1 through output ports 016-019, 2-bit signaling information SG1, SG2 as in (c) of FIG. 1 through output ports 020, 021 and 2-bit synchronization information SY1, SY2 as in (c) of FIG. 1 through output ports 022, 023.

Then the first parallel/serial circuit 19 which receives 8-bit data information as in (c) of FIG. 1 from the output ports 004-007 of first register 16 and from the output ports 008-011 of second register 17 inputs it at the rising edge of the FS signal like in (a) of FIG. 3A and (j) of FIG. 3B which is applied to its load terminal from the frequency divider (not shown) through the line 10 and transmits data one bit by one bit in consecutive order toward a data terminal (not shown) through the line 12 like in (h) of FIG. 3A in accordance with the first transmission clock signal like in (b) of FIG. 3A which is applied to its clock terminal CK from the frequency divider through the line 11.

On the other hand, the second parallel/serial circuit 20 receives 8-bit voice information as in (c) of FIG. 1 which is applied from the output ports 012-015 of second register 17 and from the output ports 016-019 of third register 18 at the rising edge of the inverted RxSHEN signal RxSHEN which is applied to its load terminal through the line 6 and transmits 8-bit voice information as in (c) of FIG. 1 one bit by one bit in consecutive order toward the combo-codec through the line 9 like in (g) of FIG. 3A.

And, the data collection circuit which comprises a dual addressable latch 21 and a latch circuit 22 receives 2-bit signaling information as in (c) of FIG. 1 in every frame period from the output ports 020, 021 of third register 18 and outputs 8 bits of signaling information collected during four frame periods. A detailed explanation thereof will be given hereinbelow.

The dual addressable latch 21 which receives 2 bits of signaling information SG1, SG2 like in (r) of FIG. 3B at its two input terminals D1, D2 from the output ports 020, 021 of third register 18 in every frame period latches them to the two output terminals which correspond to the address data like in (p) and (q) of FIG. 3B which are applied to its two address terminals A1, A2 from counter 24 every time the TxEN signal like in (1) of FIG. 3B is applied from the frequency divider through the line 13 and so it applies 8 bits of signaling information to the latch circuit 22.

Then, the latch circuit 22 receives this 8 bits of signaling information which is applied from dual addressable latch 21 in accordance with the latch clock signal like in (n) of FIG. 3A which is applied to the clock terminal CK from the AND gate G2 through the line 7 and transmits through a bus line 15 the 8 bits of signaling information inputted thereto when its output ENABLE terminal OE is enabled by a read signal from the central processing unit through a line 14.

That the signaling information is collected by 8 bits is to enable the subscribed outgoing numbers and real time information of the other country or the control data of the digital telephone itself to be read easily and to reduce the program load of the central processing unit because these are transmitted by being divided into the signaling information of the several frame periods.

Lastly, various signals which are inputted from the frequency divider will be described briefly. The FS signal is an inverted frame synchronous signal to divide the sections of 2B+D data.

The first transmission clock signal is a transmission synchronous signal used when data information is transmitted to and received from the data terminal. It has a frequency of about 64 KHz which is the transmission bit rate.

The second transmission clock signal is a transmission synchronous signal used when voice information is transmitted to and received from the combo-codec. It has a frequency of about 128 KHz which is the transmission bit rate.

The third transmission clock signal is a transmission synchronous signal used when data information is transmitted to and received from a private branch exchange (PBX) or a key telephone system. It has a frequency of about 512 KHz which is the transmission bit rate.

The clock for frame synchronous generation is a basic clock to generate a frame synchronous signal. It has a frequency of about 8 KHz identical with the frequency of the frame synchronous signal. In addition, the RxSHEN and TxEN signals are the signals used to perform such functions as represented by their names.

As described hereinabove, the present invention is advantageous in that it can provide vocal telephone service and data communication service at the same time by separately processing voice, data and signaling information in the basic access channel structure 2B+D which is the channel structure for basic information communication of the ISDN and in that it can receive vocal telephone service and data communication service by being connected even with a private branch exchange and a key telephone system for the ISDN.

Although specific constructions and procedures of the invention have been illustrated and described herein, it is not intended that the invention be limited to the elements and constructions disclosed. One skilled in the art will easily recognize that the particular elements or subconstructions may be used without departing from the scope and spirit of the invention.

What is claimed is:

1. In combination with a central processing unit providing a read signal, a combo-codec and a frequency divider providing a first transmission clock signal, a second transmission clock signal, a third transmission clock signal, a frame synchronous bar signal, FS, a reception-shift-enable signal, RxSHEN, and a transmission-enable signal, TxEN, a circuit for separating voice, data and signalling information of a digital basic access frame, said circuit comprising:

serial/parallel conversion means for receiving at a data input thereof serial digital data of a basic access frame and for outputting via a plurality of output ports thereof said digital data of said basic access frame as parallel digital data of said basic access frame in accordance with a serial-parallel conversion clock signal applied thereto;

first parallel/serial circuit means operably connected with said frequency divider and with said serial/parallel conversion means, for receiving parallel digital data corresponding to data information of said received digital basic access frame from a first output port of said serial/parallel conversion means in accordance with said frame synchronous bar signal FS from said frequency divider, and for outputting said digital data representing data information of said received digital basic access frame as serial digital data in accordance with said first transmission clock signal from said frequency divider;

second parallel/serial circuit means operably connected with said frequency divider and with said serial/parallel conversion means, for receiving parallel digital data corresponding to voice information of said received digital basic access frame from a second output port of said serial/parallel conversion means in accordance with an inverted reception-shift-enable signal $\overline{\text{RxSHEN}}$ applied to said second parallel/serial circuit means, and for outputting said digital data representing voice information of said received digital basic access frame as serial digital data to said combo-codec in accordance with said second transmission clock signal from said frequency divider;

data separation control circuit means operably connected with said frequency divider, said serial/parallel conversion means and said second parallel/serial circuit means, and receiving said reception-shift-enable signal RxSHEN, said transmission-enable signal TxEN and said third transmission clock signal from said frequency divider, for generating and outputting said inverted reception-shift-enable signal $\overline{\text{RxSHEN}}$ to said second parallel/serial circuit means, and for generating and outputting said serial-parallel conversion clock signal to said serial/parallel conversion means in accordance with said reception-shift-enable signal and said third transmission clock signal, and for receiving from a third output port of said serial/parallel conversion means digital data corresponding to synchronization information of said received digital basic access frame and for generating and outputting an address signal and a latch clock signal in accordance with said synchronization information, said reception-shift-enable signal RxSHEN, said inverted reception-shift-enable signal $\overline{\text{RxSHEN}}$ and said transmission enable signal TxEN; and data collection means operably connected with said serial/parallel conversion means, said data separation control circuit means, said frequency divider and said central processing unit, for receiving and collecting from a fourth output port of said serial/parallel conversion means digital data corresponding to signalling information of a predetermined number of received digital basic access frames in accordance with said transmission-enable signal TxEN from said frequency divider and said address signal from said data separation control circuit means, and for outputting to said central processing unit said digital data representing said collected signalling information of said predetermined number of basic access frames in accordance with said latch clock signal from said data separation control circuit means and said read signal from said central processing unit.

2. The circuit for separating voice, data and signalling information according to claim 1, wherein said serial/parallel conversion means comprises a plurality of registers serially connected for receiving digital data having serial basic access channel structure.

3. The circuit for separating voice, data and signalling information according to claim 1, wherein said serial/parallel conversion means comprises first through third registers serially connected for receiving digital data having serial basic access channel structure.

4. The circuit for separating voice, data and signalling information of a digital basic access frame according to claim 1, wherein said first parallel/serial circuit means comprises a first parallel/serial circuit having parallel data inputs operably connected with said first output port of said parallel/serial conversion means for receiving parallel digital data therefrom corresponding to only data information of said received basic access frame.

5. The circuit for separating voice, data and signalling information of a digital basic access frame according to claim 1, wherein said second parallel/serial circuit means comprises a second parallel/serial circuit having parallel data inputs operably connected with said second output port of said parallel/serial conversion means for receiving parallel digital data therefrom corresponding to only voice information of said received basic access frame.

6. The circuit for separating voice, data and signalling information of a digital basic access frame according to claim 1, wherein said data separation control circuit means comprises:

an inverter means having an input for receiving said reception-shift-enable signal RxSHEN and an output for providing said inverted reception-shift-enable signal $\overline{\text{RxSHEN}}$;

a flip-flop means having a clock input operably connected with the output of said inverter means, a D input terminal operably connected with said third output port of said serial/parallel conversion means, and a Q output terminal;

a first AND gate means having a first input operably connected in parallel with said input of said inverter means, a second input for receiving said third transmission clock signal from said frequency divider, and an output operably connected with said serial/parallel conversion means for outputting thereto said serial-parallel conversion clock signal;

a second AND gate means having a first input operably connected in parallel with said input of said inverter means, a second input operably connected with said Q output of said flip-flop means, and an output operably connected with said data collection means for supplying said latch clock signal thereto; and a counter means having a clock input terminal for receiving said transmission-enable signal TxEN from said frequency divider, and also having a clear input terminal operably connected with said output of said second AND gate means for receiving said latch clock signal therefrom, and also having an output port operably connected with said data collection means for supplying said address signal thereto in accordance with said transmission-enable signal TxEN.

7. The circuit for separating voice, data and signalling information of a digital basic access frame according to claim 1, wherein said data colection means comprises:

a dual addressable latch means having an input terminal for receiving said transmission-enable signal TxEN from said frequency divider, and also having a data input port operably connected with said fourth output port of said serial/parallel conversion means for receiving therefrom digital data corresponding to signalling information of a received digital basic access frame, and also having an address input port operably connected with said data separation control circuit means for receiving said address signal therefrom, and also having a data output; and a latch circuit means having a clock input terminal operably connected with said data separation control circuit means for receiving said latch clock signal therefrom, a data input operably connected with said data output of said dual addressable latch means, and also having a data output bus and an output enable terminal for receiving said read signal from said central processing unit in accordance with said transmission-enable signal TxEN from said frequency divider and said address signal from said data separation control circuit means, and for outputting to said central processing unit said digital data representing said collected signalling information of said predetermined number of basic access frames in accordance with said latch clock signal from said data separation control circuit means and said read signal from said central processing unit.

* * * * *

UNITED STATES PATENT AND TRADEMARK OFFICE
CERTIFICATE OF CORRECTION

PATENT NO. : 5,018,141
DATED : May 21, 1991
INVENTOR(S) : Ki-Cheol KIM

It is certified that error appears in the above-indentified patent and that said Letters Patent is hereby corrected as shown below:

| | | |
|---|---|---|
| Column 2, | line 6, | after "from", change " a " to --the--; |
| | line 57, | before "according", insert -- , --; |
| Column 3, | line 5, | after "supplies", insert -- a --; |
| | line 13, | after "signal", change "RxSHEN" to --$\overline{Rx\,SHEN}$--; |
| | line 42, | after "generates", change " a " to --the--; |
| | line 58, | after "having", insert --been--; |
| Column 4, | line 46, | after "information", insert --as--; |

UNITED STATES PATENT AND TRADEMARK OFFICE
CERTIFICATE OF CORRECTION

PATENT NO. : 5,018,141
DATED : May 21, 1991
INVENTOR(S) : Ki-Cheol KIM

It is certified that error appears in the above-indentified patent and that said Letters Patent is hereby corrected as shown below:

Column 5, line 2, after "signal", change "RxSHEN" to --$\overline{RxSHEN}$--:

Signed and Sealed this

Eighth Day of October, 1996

*Attest:*

BRUCE LEHMAN

*Attesting Officer*  *Commissioner of Patents and Trademarks*